US012717898B2

(12) United States Patent
Draper et al.

(10) Patent No.: US 12,717,898 B2
(45) Date of Patent: Aug. 25, 2026

(54) ENFORCEMENT OF QUARANTINE MIDDLEWARE EXECUTION FOR PERFORMANCE METRICS

(71) Applicant: Rubrik, Inc., Palo Alto, CA (US)

(72) Inventors: Andrew William Draper, Newcastle-upon-Tyne (GB); Haijin He, South Setauket, NY (US); Karthick Raja Ravichandran, Cupertino, CA (US); Kunal Sean Munshani, Fremont, CA (US); William Michael Davis, Brisbane (AU); Xiaoyang Zhao, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 141 days.

(21) Appl. No.: 18/672,865

(22) Filed: May 23, 2024

(65) Prior Publication Data

US 2025/0363207 A1 Nov. 27, 2025

(51) Int. Cl.
*G06F 21/54* (2013.01)
*G06F 21/56* (2013.01)

(52) U.S. Cl.
CPC ............ *G06F 21/54* (2013.01); *G06F 21/568* (2013.01)

(58) Field of Classification Search
USPC ............................................................ 726/22
See application file for complete search history.

(56) References Cited

U.S. PATENT DOCUMENTS 9,940,460 B1 * 4/2018 Derbeko ............. G06F 11/1458
12,367,125 B1 * 7/2025 Forino .................... G06F 9/455
2011/0126047 A1 * 5/2011 Anderson ............... H04L 63/08 709/224
2018/0077040 A1 * 3/2018 Araki .................. G06F 11/1464
2018/0373877 A1 * 12/2018 Bruso ................... G06F 21/552
2019/0205125 A1 * 7/2019 van Schaik ............. G06F 8/751
2020/0280540 A1 * 9/2020 Meyer ................... G06F 21/566
2022/0100378 A1 * 3/2022 Borate .................. G06F 21/568
2022/0263657 A1 * 8/2022 Chang ................... H04L 9/0891
2022/0345481 A1 * 10/2022 Shua ..................... H04L 67/101
2023/0011413 A1 * 1/2023 Brebner .............. G06F 11/1451
2024/0126918 A1 * 4/2024 Segev ..................... G06F 21/54
2024/0256670 A1 * 8/2024 Jindal ................... G06F 21/554

FOREIGN PATENT DOCUMENTS

CN 102023863 A * 4/2011
CN 114692151 A * 7/2022 ........... G06F 21/568
CN 115576741 A * 1/2023 .......... G06F 11/1446
CN 116668433 A * 8/2023 ............. H04L 67/06

* cited by examiner

*Primary Examiner* — Sakinah White-Taylor
(74) *Attorney, Agent, or Firm* — Holland & Hart LLP

(57) ABSTRACT

Methods, systems, and devices for data management are described. For example, the method may include a backup system receiving a request to recover a target computing object using a snapshot of one or more computing objects, the one or more computing objects including the target computing object, determining, by the backup system in response to the request, whether the snapshot is prohibited from restoration based on whether information associated with the snapshot is flagged for quarantine, executing, by the backup system after determining that the snapshot is not prohibited from restoration, a quarantine enforcement procedure in association with recovering the snapshot, and monitoring, by the backup system, one or more performance metrics associated with execution of the quarantine enforcement procedure.

20 Claims, 10 Drawing Sheets

500

ENFORCEMENT OF QUARANTINE MIDDLEWARE EXECUTION FOR PERFORMANCE METRICS

FIELD OF TECHNOLOGY

The present disclosure relates generally to data management, including techniques for enforcement of quarantine middleware execution for performance metrics.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
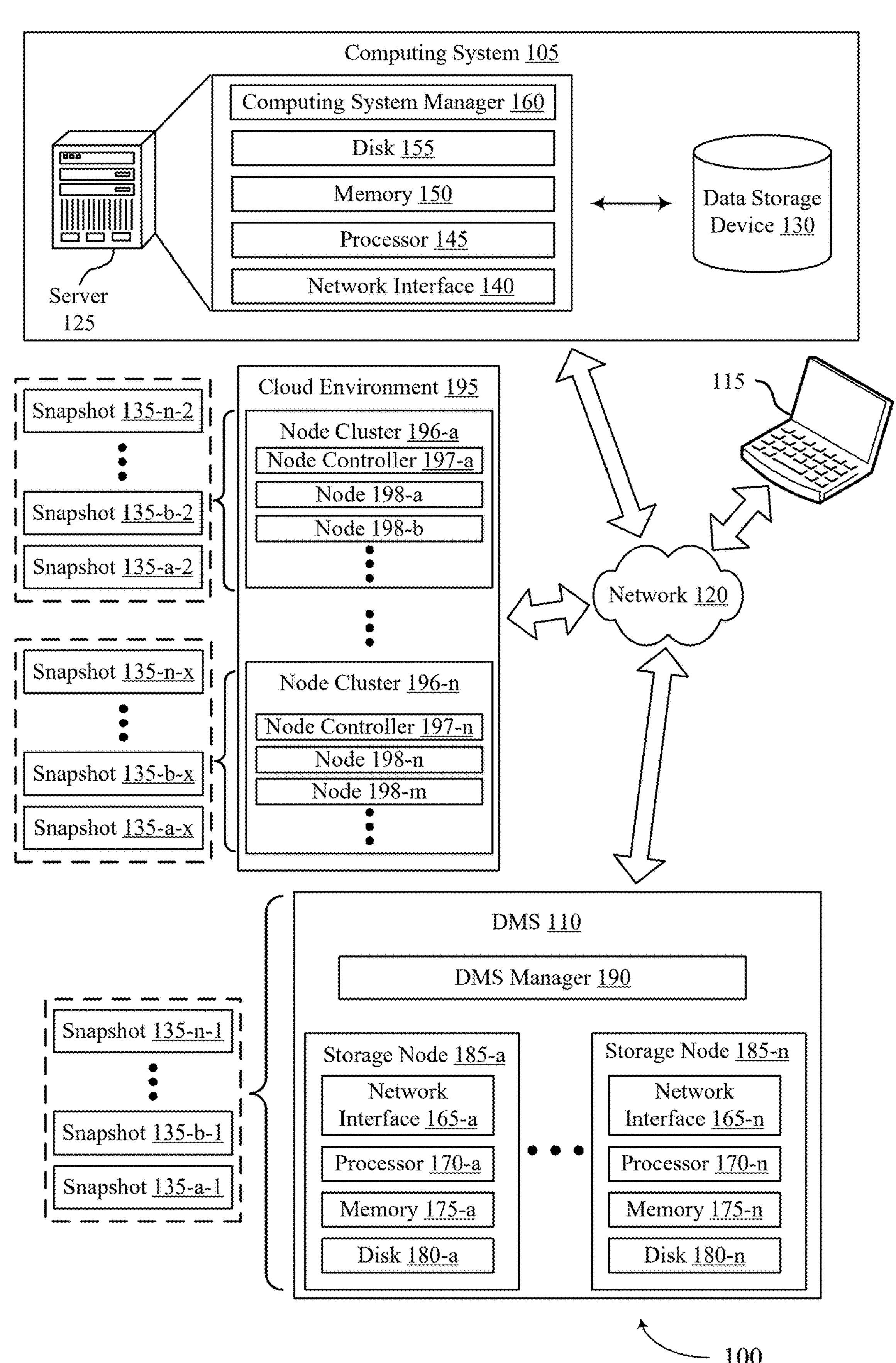
FIG. 1 illustrates an example of a computing environment that supports enforcement of quarantine middleware execution for performance metrics in accordance with aspects of the present disclosure.

Data protection systems may protect (e.g., back up) various types of computing objects (e.g., snappables), such as accounts (e.g., Microsoft 365 accounts), emails, files, virtual machines, etc. In some examples, these data protection systems may perform operations to detect whether aspects of a computing object are infected with malware, subject to a vulnerability, or the like. In such cases, the data protection system may flag the snapshot of the computing object, the computing object itself (e.g., the computing object as included within the snapshot), or both as being subject to quarantine. When a snapshot or computing object is subject to quarantine, the data protection system may prevent the computing object from being restored based on the snapshot or otherwise perform operations to prevent or limit the vulnerable object from being restored in an unsafe manner. More particularly, when a recovery of a snapshot is requested, the data protection system may (1) determine whether the snapshot or any objects within the snapshot are subject to a current quarantine and (2) enforce the quarantine in the snapshot recovery process via a quarantine enforcement logic.

The quarantine enforcement logic may include a path verification procedure, whereby a file path associated with a quarantined object is normalized and verified. More particularly, as a backup system may be a Unix®-based system, and as objects to be backed up may be Windows®-based objects, the backup system may be configured to store, manage, or access the snappables as Unix file paths. As such, during backup and/or recovery, windows files paths are converted to Unix file paths. As there may be different types of objects (e.g., windows snappables, virtual machines, Linux® file sets, etc.) and different versions of systems, the file path conversion process may be complex. During enforcement of a quarantined object, the converted file paths are verified such that the object is not recovered on a target system. However, as vulnerable objects, and thus quarantined objects, are relatively rare, associated execution of the quarantine enforcement logic is also relatively rare. The rarity of "live" quarantine scenarios may hinder testing and verification of the performance of the quarantine logic and recovery logic associated with snappables containing quarantined objects.

Techniques described herein support execution of the quarantine enforcement logic during a snapshot recovery process for a portion of recovery requests, even if the snapshot or an object within the snapshot is not flagged for quarantine. This allows the backup system to determine that the path conversion and path verification is being performed correctly (e.g., based on a larger sample size). Further, metrics related to quarantine querying, error identification, file path recovery time, and file path error detection may be collected. Additional metrics related to general recovery may also be collected. As such, a configurable percentage of recovery requests are routed to the quarantine enforcement logic, and a second percentage (or all) recovery requests and procedures are monitored for general recovery metric determination. These and other techniques are described in further detail with respect to the figures.

FIG. 1 illustrates an example of a computing environment 100 that supports enforcement of quarantine middleware execution for performance metrics in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 and/or the cloud environment 195 may analyze backups (e.g., snapshots 135) to determine the backups include malware (e.g., whether objects of the snapshot include malware or are impacted by malware) or are otherwise vulnerable (e.g., include vulnerable configurations). For example, the DMS 110 may mount snapshots and scan the mounted snapshots for malware or other types of vulnerabilities. If a malware of vulnerability is detected, then the DMS 110 and/or the cloud environment may store metadata (e.g., information) that indicates that the snapshot and/or a vulnerable object within the snapshot is subject to quarantine. Such information may be stored in a metadata table, a quarantine table, a quarantine ledger, or the like. As such, the DMS 110 and/or the cloud environment 195 may generate, maintain, and/store various metadata about the snapshots 135. Additionally, a service (e.g., a middleware service of the DMS 110 and/or the cloud environment 195) may receive requests to recover or restore a backup (e.g., a snapshot) on a target computing environment, such as the computing system 105. In some cases, the service may determine whether the snapshot 135 or any objects covered or backed-up by the snapshot 135 are subject to a quarantine by querying a datastore that stores the quarantine metadata. If the service detects that the snapshot 135 is subject to a quarantine, then the service may execute some quarantine enforcement logic.

The quarantine enforcement logic, which may be performed by the middleware service, may include a path normalization and/or verification procedure, whereby a file path associated with a quarantined object is verified. More particularly, as a backup system may be a Unix®-based system, and as objects to be backed up may be Windows®- based objects, the backup system may be configured to store, manage, and/or access the snappables as Unix file paths. As such, during backup or before recovery, windows files paths are converted to Unix file paths. As there may be different types of objects (e.g., windows snappables, virtual machines (VMs), Linux® file sets, etc.) and different versions of systems, the file path conversion process may be complex. During enforcement of a quarantined object, the converted file paths are verified such that the object is not recovered on a target system. However, as vulnerable objects, and thus quarantined objects, are relatively rare, associated execution of the quarantine enforcement logic is also relatively rare. The rarity of "live" quarantine scenarios may hinder testing and verification of the performance of the quarantine logic and recovery logic associated with snappables containing quarantined objects.

Techniques described herein support execution of the quarantine enforcement logic during a snapshot recovery process for a percentage of recoveries, even if the snapshot 135 or an object within the snapshot 135 is not flagged for quarantine. This allows the backup system to determine that the path conversion and path verification is being performed correctly (e.g., based on a larger sample size). Further, metrics related to quarantine querying, error identification, file path recovery time, and file path error detection may be collected. Additional metrics related to general recovery may also be collected. As such, a configurable percentage of recovery requests are routed to the quarantine enforcement logic, and a second percentage (or all) recovery requests and procedures are monitored for general recovery metric determination.

Figure 2:
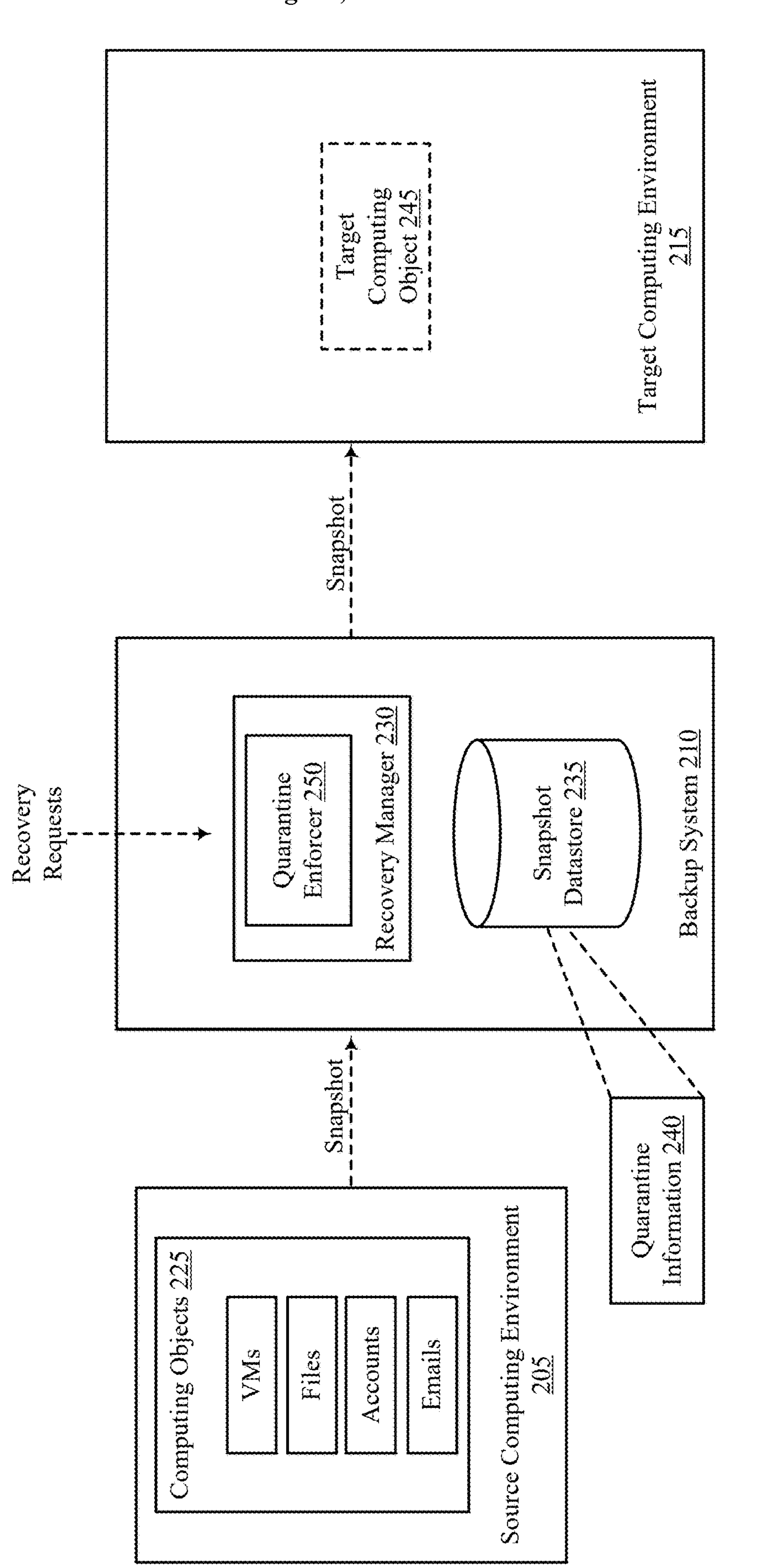
FIG. 2 shows an example of a computing environment that supports enforcement of quarantine middleware execution for performance metrics in accordance with aspects of the present disclosure.

FIG. 2 shows an example of a computing environment 200 that supports enforcement of quarantine middleware execution for performance metrics in accordance with aspects of the present disclosure. The computing environment 200 includes a source computing environment 205, a backup system 210, and a target computing environment 215. The source computing environment 205 and/or the target computing environment 215 may be examples of aspects of the computing system 105 of FIG. 1, and the backup system 210 may be an example of the DMS 110, the cloud environment 195, or another system or service with access to aspects of the DMS 110 or the cloud environment 195 of FIG. 1.

The backup system may support management and recovery of various computing objects 225 of the source computing environment 205. For example, the source computing environment 205 may generate and provide, to the backup system 210, snapshots of the computing objects 225, and a snapshot included in the provided snapshots may cover (e.g., back up) multiple computing objects or may back up one computing object individually. Further, some computing objects, such as a virtual machine (VM) may have multiple computing objects therein, such as files, accounts, etc., and a snapshot of such an individual computing object may back up multiple computing objects included within the individual computing object. In some examples, the source computing environment 205 may include or execute an operating system that is different from the operating system included or executed by the backup system 210. Further, the backup system 210 may support backup of various source computing environments with different operating systems and different versions. Further, applications and computing objects 225 within a source computing environment 205, such as source computing environment 205, may have different versions, formats, configurations etc. Accordingly, the backup system 210 may be configured to handle various types of operating systems, versions, objects, formats, etc.

As described herein, the backup system 210 or an associated system may support identification of, response to, and management of potential malware or vulnerability threats, such as ransomware. For example, the backup system 210 may include an engine that scans snapshots of an object (like a virtual machine, database, or file system) to find indications of a security breach. If a system is found to be infected, the malware engine enables the recovery to a most recent safe snapshot, aiming to restore the maximum amount of data while eliminating the malware from the source computing environment. The scanning may be performed based on receipt of the snapshot, based on a request to recover a snapshot (or target computing object), or both.

The backup system 210 may also include components for hydrating (materializing/instantiating) and mounting the snapshots and scanning using rules and hashes for malware detection. Additionally, the backup system 210 may recover infected snapshots or files for forensic analysis or restrict what snapshots or content can be restored based on user privileges. The backup system 210 ensures that the status of infected (quarantined) snapshots is communicated to other locations where a copy of the infected snapshot may be found. This process helps prevent accidental restoration of an infected snapshot, which could spread malware. The backup system 210 may, for example, store quarantine status for snapshots and/or computing objects in a ledger (e.g., append-only ledger), table, or the like. Such information (e.g., quarantine information 240) may be stored, along with snapshots, in one or more datastores, such as a snapshot datastore 235 of the backup system 210.

The backup system 210 may include a recovery manager 230 that receives recovery requests (e.g., via an API) and executes operations to perform recovery, such as by providing a snapshot to the target computing environment 215 to restore a target computing object 245. The recovery manager 230 may also include a quarantine enforcer 250 that is used to enforce quarantine conditions. For example, recovery request may be intercepted by a software layer (which may be referred to as the quarantine enforcer 250) that is used to enforce quarantine conditions for a restoration procedure of a requested snapshot. In some examples, the software layer may be implemented (e.g., as middleware) between a front-end of an API that provides access to an application for restoring a requested snapshot and the application for restoring a requested snapshot (e.g., the recovery manager 230). The software layer may intercept each call to the API, including indirect calls to the API received from a user via an interface of a system that contains the application and direct calls to the application via a user-accessible interface. The quarantine enforcer 250 may also determine a privilege of a user based on the call to the API.

After receiving or intercepting a recovery request, the quarantine enforcer 250 may identify a chain of backup information for restoring the requested information. For example, if the request is for a snapshot of a target object, the storage appliance may identify one or more additional snapshots for rebuilding the requested snapshot, for example, if the requested snapshot is an incremental or differential snapshot. Similarly, if the request is for a file in a target object, the storage appliance may identify one or more additional files for rebuilding the file. For example, if a request to restore a snapshot C is received, the storage appliance may determine that snapshots A and B are to be used to reconstruct snapshot C. In another example, if a request to restore a snapshot G is received, the storage appliance may determine that snapshots C is to be used to reconstruct snapshot G.

In some examples, a sequence of backup information for an object may be identified. For example, if the request is for a snapshot of a target object, the storage appliance may identify one or more additional snapshots taken for the target object. That is, the storage appliance may identify one or more snapshots taken within a time range of the requested snapshot. For instance, the storage appliance may identify snapshots taken up to a month before the snapshot, snapshots taken up to a month after the snapshot, or snapshots taken a half-month before and a half-month after the snapshot. Similarly, if the request is for a file in a target object at a time point, the storage appliance may identify one or more additional versions of the file that occurred within a time range of the time point. Identification of snapshots, snapshot chains, files, objects, etc. may be performed by querying a datastore, such as snapshot datastore 235.

In some examples, a ledger may be consulted to determine whether the request to restore the information is to be granted. When the ledger is used, consulting the ledger may include analyzing each entry in the ledger to determine whether any of the information used to reconstruct the requested information has been quarantined. Consulting the ledger may also include analyzing each entry in the ledger to determine whether any of the information has been released from quarantine. Additionally, or alternatively, consulting the ledger may include identifying and analyzing an entry for one or more snapshots including the information requested for restoration.

After determining whether the snapshot or snapshot chain is associated with the quarantine information, the quarantine enforcer 250, the recovery manager 230, or both, may prevent recovery, perform a full recovery, perform a partial recovery, and/or allow a sandboxed recovery, depending on the quarantine information, user privileges, and/or configurations. However, as described herein, it is expected that the number of quarantined snapshots on the backup system may make up a small percentage of the snapshots on the backup system 210. As a result, the quarantine enforcement logic (which may include determining whether snapshots, snapshot chains, information/content/objects within snapshots are associated with quarantine information) may be triggered infrequently. As a result, it may be difficult to determine whether the quarantine enforcement logic is executing effectively and efficiently.

Techniques described herein support collection of additional data related to the performance and robustness of the quarantine enforcement logic. For example, the quarantine enforcer 250 may function in a "shadow mode" (according to a configuration), whereby the quarantine enforcement logic is executed for a percentage or portion of recovery requests even if the information or snapshot to be recovered is not flagged for quarantine. A configuration property may be used to determine whether the "shadow mode" is active and what percentage of requests are to be run through the quarantine enforcement logic. In some cases, if a request is selected to run through the full quarantine enforcement logic, a flag is passed to the quarantine enforcer 250 to indicate that the shadow mode is active for the request. In some examples, when the flag is set such that shadow mode is active, the recovery is executed even if some errors are encountered during execution of the quarantine enforcement logic (e.g., a recovery request is not blocked if errors are encountered).

Example metrics that may be collected may include the time taken to query for quarantine details for the recovery snapshots, the quantity of errors and error messages which occurred when querying for the quarantine details for the recovery snapshots, the time taken to convert the recovery file paths to a standardized format, and the number of errors and error messages which occurred when converting the recovery file paths to a standardized format. For example, as described herein, the quarantine enforcer may query for (e.g., at a ledger, table, or other data structure) quarantine information associated with a requested object, a requested snapshot (e.g., that backs-up the object), a snapshot chain, and the like. Identification of such information associated with one or multiple snapshots may be complex and may take time. As a result, the backup system 210 may implement the shadow mode such as to verify that querying for such information is efficient and performed accurately.

Additionally, execution of the enforcement logic may include converting file paths associated with various snapshots, objects, and/or content into file paths supported by the backup system 210. For example, the snapshot data may be stored in the snapshot datastore 235 in a format (e.g., Windows®) supported by a computing environment from which the snapshot is obtained, such as the source computing environment 205. However, to enforce quarantine (e.g., to identify quarantine information and/or to enforce a quarantine during a recovery), the backup system 210 may be configured to handle the file paths in a format that is native to the backup system (e.g., Unix®). More particularly, when a quarantined snapshot is identified, the file paths that are actually quarantined may also be identified. Identification of such file paths may be conditioned on path normalization or conversion. As such, the enforcement logic may include procedures for file path normalization or conversion. However, as noted herein, different versions of different operating systems may be in various source computing environments managed by the backup system 210, and as such, the normalization procedures may be complex. The normalization may also be complex due to older snapshots being stored or managed differently relative to more recent snapshots. Execution of the quarantine enforcement logic, even though a snapshot is not associated with quarantine information, may allow the backup system 210 to determine whether path normalization is being performed correctly and efficiently. Thus, the backup system 210 may collect the time taken to convert recovery file paths to a standardized format and the quantity of errors and error messages encountered during conversion. Example errors may include missing data, database connection loss, and corruption of quarantine details.

In addition to or alternatively to quarantine enforcement execution metrics, the backup system 210 may also collect additional metrics associated with recovery. For example, the backup system 210 may determine the number of recovery operations requested and/or performed in a given time period. The backup system 210 may also determine the types of objects being recovered, such as virtual machines, Linux filesets, Oracle databases, etc. In some examples, the backup system 210 determines the quantity of snapshots and/or files recovered per recovery operation. The backup system 210 may also monitor and document the details of the files being recovered such as the file type and the parent folder. Further, the backup system 210 may document the details of the user performing the recovery, such as whether the user is an administer and/or have various permissions, such as permissions to override a quarantine. Such metrics may be collected by inspecting the recovery requests as they pass through the middleware (e.g., the quarantine enforcer 250). Additionally, metrics associated with the quarantine enforcement logic, in addition to general recovery metrics, may be stored and surfaced (e.g., via a UI).

Figure 3:
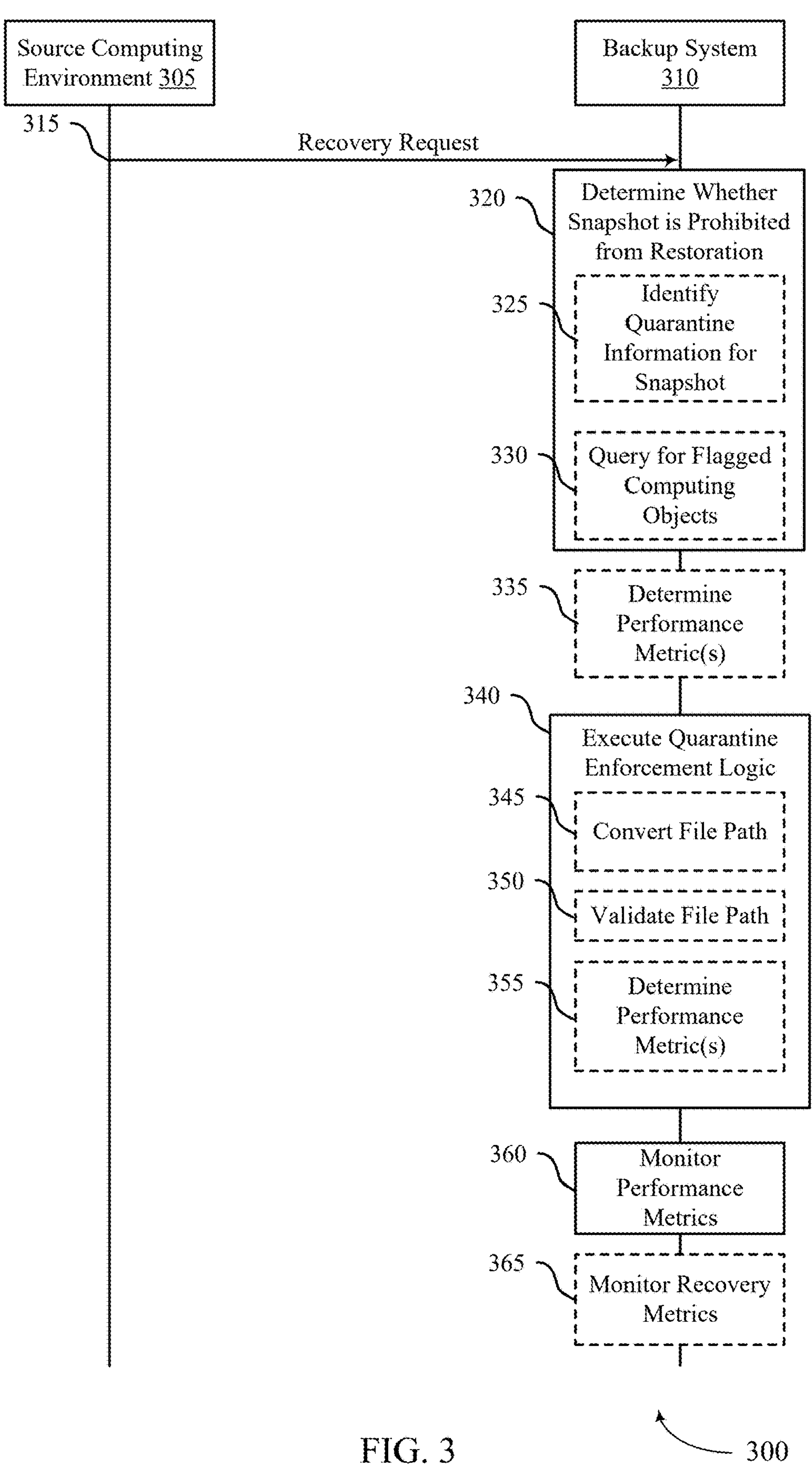
FIG. 3 shows an example of a process flow that supports enforcement of quarantine middleware execution for performance metrics in accordance with aspects of the present disclosure.

FIG. 3 shows an example of a process flow 300 that supports enforcement of quarantine middleware execution for performance metrics in accordance with aspects of the present disclosure. The process flow 300 includes a target computing environment 305 and a backup system 310, which may be examples of aspects of the corresponding devices or system as described herein with respect to FIGS. 1 and 2. For example, the backup system 310 may represent or include a middleware service that receives and/or processes recovery requests. Alternative examples of the following may be implemented, where some operations are performed in a different order than described or are not performed at all. In some cases, operations may include additional features not mentioned below, or further operations may be added. Although the source computing environment 305 and the backup system 310 are shown performing the operations of the process flow 300, some aspects of some operations may also be performed by one or more other components or systems.

At 315, the backup system 310 may receive a request to recover a target computing object using a snapshot of one or more computing objects that includes the target computing object.

At 320, the backup system 310 may determine, in response to the request, whether the snapshot is prohibited from restoration based at least in part on whether information associated with the snapshot is flagged for quarantine. A snapshot or a data object may be flagged for quarantine based on the backup system 310 or another system determining that the snapshot or the data object is infected with malware or is subject to a vulnerability. For example, at 325, to determine whether the snapshot is prohibited from restoration, the backup system 310 may determine that the information associated with the snapshot indicates that the snapshot is not prohibited from restoration. Such information may be included in a metadata table, a quarantine table, an append-only structure, or the like. In some examples, at 330, to determine whether the snapshot is prohibited from restoration, the backup system 310 may query, after determining that the information associated with the snapshot indicates that the snapshot is not prohibited from restoration, a data store for second information indicative of whether the one or more computing objects associated with the snapshot comprise a computing object that is flagged for quarantine. For example, the backup system may query a datastore (e.g., an append-only data structure) using file paths for various objects and the file paths may be associated with a quarantine flag or other information that indicates whether the file path, and thus the corresponding data object, to be quarantined.

At 335, the backup system 310 may determine at least one first performance metric based on a query response time associated with querying the data store for the second information. Additionally, or alternatively, at 335, the backup system 310 may determine at least one first performance metric based at least in part on a quantity of errors identified in response to querying the data store for the second information.

At 340, the backup system 310 may execute, after determining that the snapshot is not prohibited from restoration, a quarantine enforcement procedure in association with recovering the snapshot. That is, the quarantine enforcement procedure is executed even though the backup system determines that the snapshot or a computing object backed up by the snapshot is not subject to quarantine. This allows the backup system 310 to determine that the quarantine enforcement procedure is working correctly or to identify errors associated with execution of the quarantine enforcement procedure. Execution of the quarantine enforcement procedure may include, at 345, converting a second file path associated with the target computing object to a first file path. In such cases, the second file path is of a second type, and the first file path is of a first type that is compatible with the backup system 310 (e.g., a Unix based file path). Additionally, execution of the quarantine enforcement logic may include, at 350, validation that conversion of the second file path to the first file path is successful. In some examples, execution of the quarantine enforcement procedure may be performed despite determining that the snapshot is not prohibited from restoration in accordance with a configuration at the backup system. In such cases, the configuration may specify that a quarantine enforcement metric monitoring mode is active, that the quarantine enforcement procedure is to be executed for at least a threshold portion of recovery operations, or any combination thereof.

At 355, the backup system 310 may determine at least one first performance metric based at least in part on a quantity of errors identified in association with converting the second file path to the first file path or a quantity of errors identified in association with converting multiple file paths for data objects in the snapshot. Thus, in validating the first file path associated with the target computing object, the backup system 310 may determine performance metrics associated with the quarantine enforcement logic.

At 360, the backup system 310 may monitor one or more performance metrics associated with execution of the quarantine enforcement procedure. The backup system 310 may monitor the performance metrics for multiple executions of the quarantine enforcement procedure for multiple recovery requests irrespective of whether the requested snapshot or a computing object backed-up by the snapshot is subject to quarantine.

At 365, the backup system 310 may monitor, one or more recovery metrics associated with a plurality of recovery operations performed at the backup system 310 in response to requests to recover a plurality of target computing objects. For example, the backup system 310 may determine, as a recovery metric of the one or more recovery metrics, a quantity of recovery operations included in the plurality of recovery operations. Additionally, or alternatively, the backup system 310 may determine as a recovery metric of the one or more recovery metrics, types of computing objects being recovered for the plurality of recovery operations, a quantity of snapshots or files recovered per recovery operation of the plurality of recovery operations, a set of file types or parent folders per recovery operation of the plurality of recovery operations, user details associated with initiating each recovery operation of the plurality of recovery operations, or any combination thereof.

Figure 4:
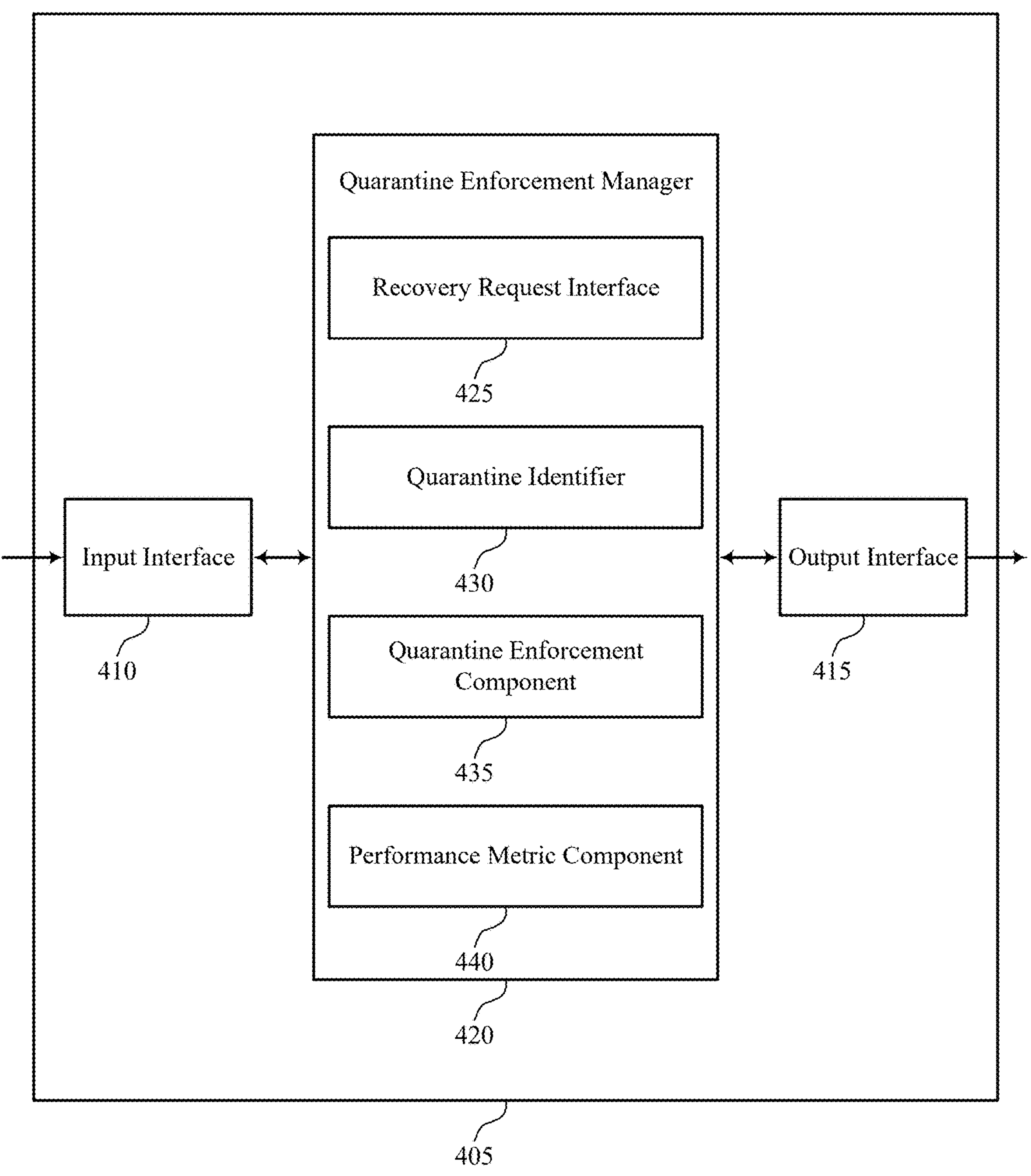
FIG. 4 shows a block diagram of an apparatus that supports enforcement of quarantine middleware execution for performance metrics in accordance with aspects of the present disclosure.

FIG. 4 shows a block diagram 400 of a system 405 that supports enforcement of quarantine middleware execution for performance metrics in accordance with aspects of the present disclosure. In some examples, the system 405 may be an example of aspects of one or more components described with reference to FIG. 1, such as a DMS 110. The system 405 may include an input interface 410, an output interface 415, and a quarantine enforcement manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the quarantine enforcement manager 420 to support enforcement of quarantine middleware execution for performance metrics. In some cases, the input interface 410 may be a component of a network interface 625 as described with reference to FIG. 6.

The output interface 415 may manage output signaling for the system 405. For example, the output interface 415 may receive signaling from other components of the system 405, such as the quarantine enforcement manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the quarantine enforcement manager 420 may include a recovery request interface 425, a quarantine identifier 430, a quarantine enforcement component 435, a performance metric component 440, or any combination thereof. In some examples, the quarantine enforcement manager 420, or various components thereof, may be configured to perform various operations (e.g., receiving, monitoring, transmitting) using or otherwise in cooperation with the input interface 410, the output interface 415, or both. For example, the quarantine enforcement manager 420 may receive information from the input interface 410, send information to the output interface 415, or be integrated in combination with the input interface 410, the output interface 415, or both to receive information, transmit information, or perform various other operations as described herein.

The recovery request interface 425 may be configured as or otherwise support a means for receiving, at a backup system, a request to recover a target computing object using a snapshot of one or more computing objects, the one or more computing objects including the target computing object. The quarantine identifier 430 may be configured as or otherwise support a means for determining, by the backup system in response to the request, whether the snapshot is prohibited from restoration based on whether information associated with the snapshot is flagged for quarantine. The quarantine enforcement component 435 may be configured as or otherwise support a means for executing, by the backup system after determining that the snapshot is not prohibited from restoration, a quarantine enforcement procedure in association with recovering the snapshot. The performance metric component 440 may be configured as or otherwise support a means for monitoring, by the backup system, one or more performance metrics associated with execution of the quarantine enforcement procedure.

Figure 5:
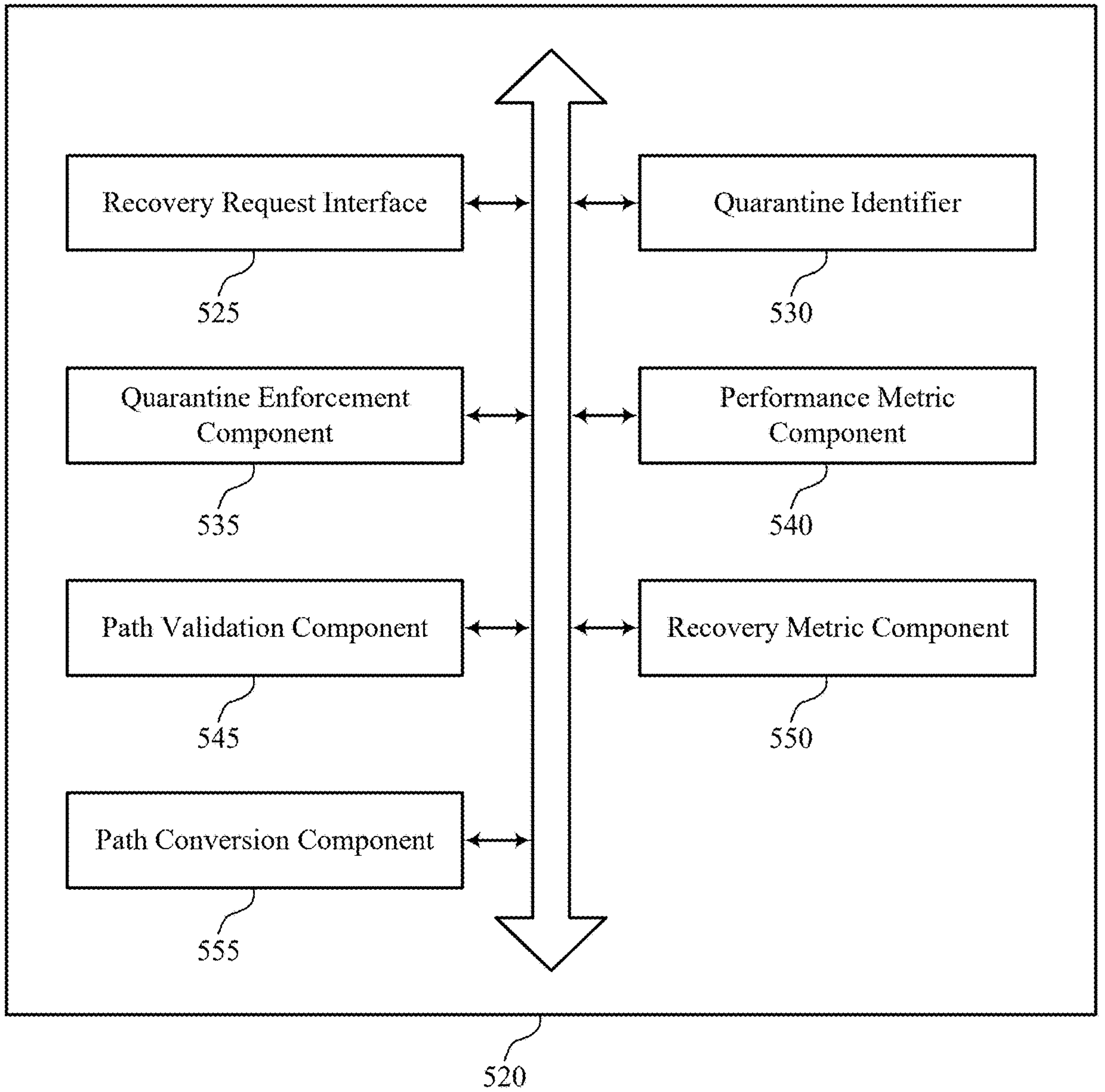
FIG. 5 shows a block diagram of a quarantine enforcement manager that supports enforcement of quarantine middleware execution for performance metrics in accordance with aspects of the present disclosure.

FIG. 5 shows a block diagram 500 of a quarantine enforcement manager 520 that supports enforcement of quarantine middleware execution for performance metrics in accordance with aspects of the present disclosure. The quarantine enforcement manager 520 may be an example of aspects of a quarantine enforcement manager or a quarantine enforcement manager 420, or both, as described herein. The quarantine enforcement manager 520, or various components thereof, may be an example of means for performing various aspects of enforcement of quarantine middleware execution for performance metrics as described herein. For example, the quarantine enforcement manager 520 may include a recovery request interface 525, a quarantine identifier 530, a quarantine enforcement component 535, a performance metric component 540, a path validation component 545, a recovery metric component 550, a path conversion component 555, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The recovery request interface 525 may be configured as or otherwise support a means for receiving, at a backup system, a request to recover a target computing object using a snapshot of one or more computing objects, the one or more computing objects including the target computing object. The quarantine identifier 530 may be configured as or otherwise support a means for determining, by the backup system in response to the request, whether the snapshot is prohibited from restoration based on whether information associated with the snapshot is flagged for quarantine. The quarantine enforcement component 535 may be configured as or otherwise support a means for executing, by the backup system after determining that the snapshot is not prohibited from restoration, a quarantine enforcement procedure in association with recovering the snapshot. The performance metric component 540 may be configured as or otherwise support a means for monitoring, by the backup system, one or more performance metrics associated with execution of the quarantine enforcement procedure.

In some examples, to support executing the quarantine enforcement procedure, the path validation component 545 may be configured as or otherwise support a means for validating a first file path associated with the target computing object, where the one or more performance metrics are based on whether the first file path is validated.

In some examples, to support validating the first file path, the path conversion component 555 may be configured as or otherwise support a means for converting, based on the quarantine enforcement procedure, a second file path associated with the target computing object to the first file path, where the second file path is of a second type, and where the first file path is of a first type that is compatible with the backup system. In some examples, to support validating the first file path, the path validation component 545 may be configured as or otherwise support a means for validating that conversion of the second file path to the first file path is successful.

In some examples, the performance metric component 540 may be configured as or otherwise support a means for determining at least one first performance metric of the one or more performance metrics based on a quantity of errors identified in association with converting the second file path to the first file path.

In some examples, the performance metric component 540 may be configured as or otherwise support a means for determining at least one first performance metric of the one or more performance metrics based on a conversion time associated with conversion of the second file path to the first file path.

In some examples, to support determining whether the snapshot is prohibited from restoration, the quarantine identifier 530 may be configured as or otherwise support a means for determining that the information associated with the snapshot indicates that the snapshot is not prohibited from restoration. In some examples, to support determining whether the snapshot is prohibited from restoration, the quarantine identifier 530 may be configured as or otherwise support a means for querying, after determining that the information associated with the snapshot indicates that the snapshot is not prohibited from restoration, a data store for second information indicative of whether the one or more computing objects associated with the snapshot include a computing object that is flagged for quarantine, where at least one first performance metric of the one or more performance metrics is determined based on querying the data store.

In some examples, the performance metric component 540 may be configured as or otherwise support a means for determining the at least one first performance metric based on a query response time associated with querying the data store for the second information.

In some examples, the performance metric component 540 may be configured as or otherwise support a means for determining the at least one first performance metric based on a quantity of errors identified in response to querying the data store for the second information.

In some examples, the request to recover the target computing object includes a request to recover a set of multiple target computing objects that includes the target computing object, and the recovery metric component 550 may be configured as or otherwise support a means for monitoring one or more recovery metrics associated with a set of multiple recovery operations performed at the backup system in response to the request to recover the set of multiple target computing objects.

In some examples, the recovery metric component 550 may be configured as or otherwise support a means for determining, as a recovery metric of the one or more recovery metrics, a quantity of recovery operations included in the set of multiple recovery operations.

In some examples, the recovery metric component 550 may be configured as or otherwise support a means for determining, as a recovery metric of the one or more recovery metrics, types of computing objects being recovered for the set of multiple recovery operations, a quantity of snapshots or files recovered per recovery operation of the set of multiple recovery operations, a set of file types or parent folders per recovery operation of the set of multiple recovery operations, user details associated with initiating each recovery operation of the set of multiple recovery operations, or any combination thereof.

In some examples, to support executing the quarantine enforcement procedure, the quarantine enforcement component 535 may be configured as or otherwise support a means for executing the quarantine enforcement procedure despite determining that the snapshot is not prohibited from restoration in accordance with a configuration at the backup system, where the configuration specifies that a quarantine enforcement metric monitoring mode is active, that the quarantine enforcement procedure is to be executed for at least a threshold portion of recovery operations, or any combination thereof.

Figure 6:
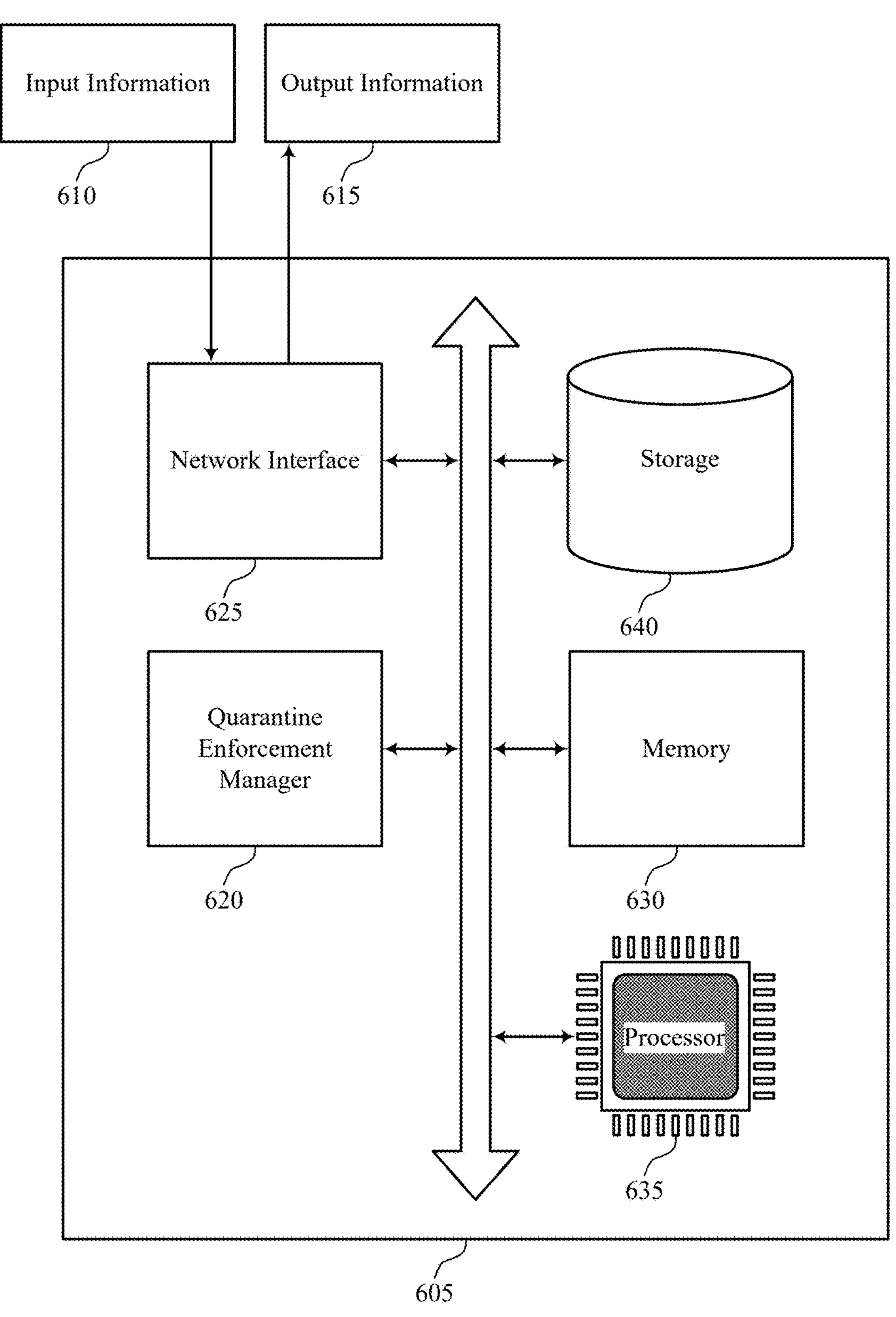
FIG. 6 shows a diagram of a system including a device that supports enforcement of quarantine middleware execution for performance metrics in accordance with aspects of the present disclosure.

FIG. 6 shows a block diagram 600 of a system 605 that supports enforcement of quarantine middleware execution for performance metrics in accordance with aspects of the present disclosure. The system 605 may be an example of or include components of a system 405 as described herein. The system 605 may include components for data management, including components such as a quarantine enforcement manager 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting enforcement of quarantine middleware execution for performance metrics). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the quarantine enforcement manager 620 may be configured as or otherwise support a means for receiving, at a backup system, a request to recover a target computing object using a snapshot of one or more computing objects, the one or more computing objects including the target computing object. The quarantine enforcement manager 620 may be configured as or otherwise support a means for determining, by the backup system in response to the request, whether the snapshot is prohibited from restoration based on whether information associated with the snapshot is flagged for quarantine. The quarantine enforcement manager 620 may be configured as or otherwise support a means for executing, by the backup system after determining that the snapshot is not prohibited from restoration, a quarantine enforcement procedure in association with recovering the snapshot. The quarantine enforcement manager 620 may be configured as or otherwise support a means for monitoring, by the backup system, one or more performance metrics associated with execution of the quarantine enforcement procedure.

By including or configuring the quarantine enforcement manager 620 in accordance with examples as described herein, the system 605 may support techniques for enforcement of quarantine middleware execution for performance metrics, which may provide one or more benefits such as, for example, improvement of computational efficiencies associated with quarantine enforcement by determining and monitoring metrics associated with quarantine enforcement irrespective of whether a snapshot is flagged for quarantine, among other possibilities.

Figure 7:
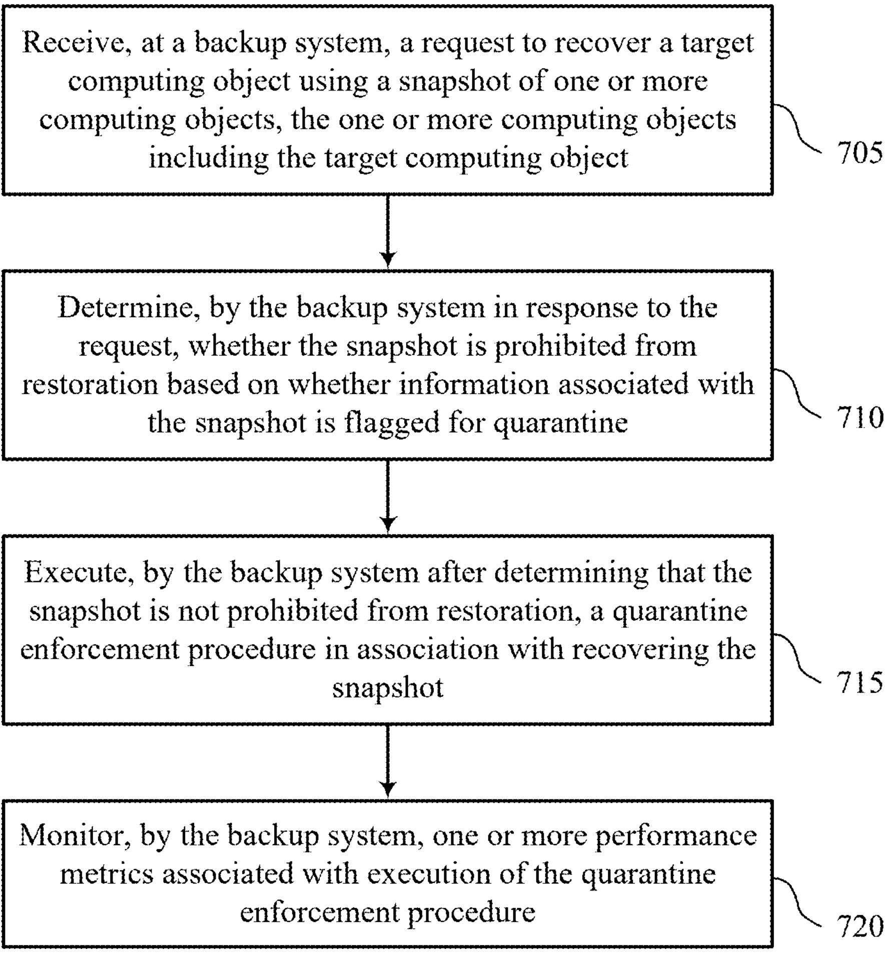
FIGS. 7 through 10 show flowcharts illustrating methods that support enforcement of quarantine middleware execution for performance metrics in accordance with aspects of the present disclosure.

FIG. 7 shows a flowchart illustrating a method 700 that supports enforcement of quarantine middleware execution for performance metrics in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, at a backup system, a request to recover a target computing object using a snapshot of one or more computing objects, the one or more computing objects including the target computing object. The operations of 705 may be performed in accordance with examples as disclosed herein. In some examples, aspects of the operations of 705 may be performed by a recovery request interface 525 as described with reference to FIG. 5.

At 710, the method may include determining, by the backup system in response to the request, whether the snapshot is prohibited from restoration based on whether information associated with the snapshot is flagged for quarantine. The operations of 710 may be performed in accordance with examples as disclosed herein. In some examples, aspects of the operations of 710 may be performed by a quarantine identifier 530 as described with reference to FIG. 5.

At 715, the method may include executing, by the backup system after determining that the snapshot is not prohibited from restoration, a quarantine enforcement procedure in association with recovering the snapshot. The operations of 715 may be performed in accordance with examples as disclosed herein. In some examples, aspects of the operations of 715 may be performed by a quarantine enforcement component 535 as described with reference to FIG. 5.

At 720, the method may include monitoring, by the backup system, one or more performance metrics associated with execution of the quarantine enforcement procedure. The operations of 720 may be performed in accordance with examples as disclosed herein. In some examples, aspects of the operations of 720 may be performed by a performance metric component 540 as described with reference to FIG. 5.

Figure 8:
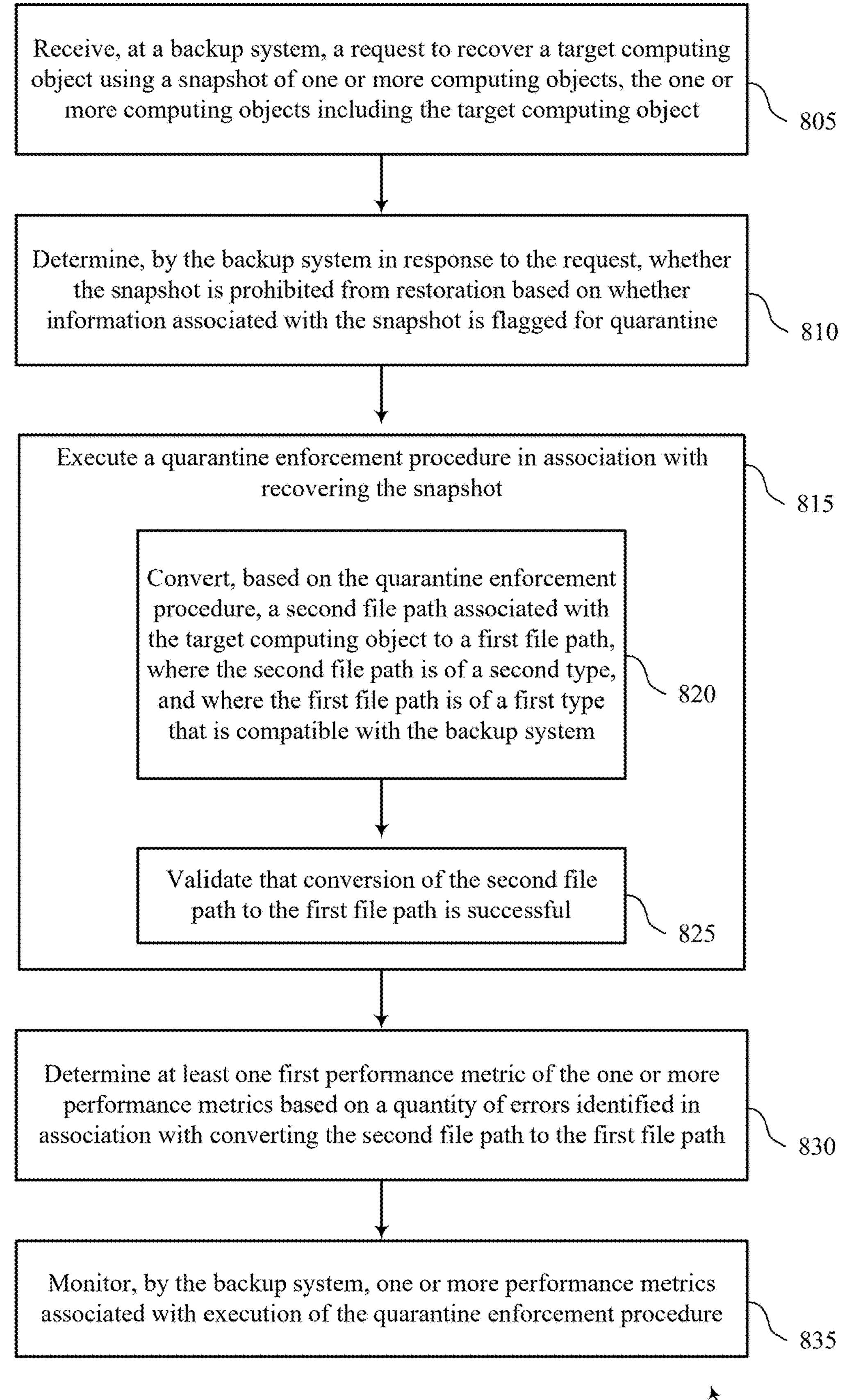

FIG. 8 shows a flowchart illustrating a method 800 that supports enforcement of quarantine middleware execution for performance metrics in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include receiving, at a backup system, a request to recover a target computing object using a snapshot of one or more computing objects, the one or more computing objects including the target computing object. The operations of 805 may be performed in accordance with examples as disclosed herein. In some examples, aspects of the operations of 805 may be performed by a recovery request interface 525 as described with reference to FIG. 5.

At 810, the method may include determining, by the backup system in response to the request, whether the snapshot is prohibited from restoration based on whether information associated with the snapshot is flagged for quarantine. The operations of 810 may be performed in accordance with examples as disclosed herein. In some examples, aspects of the operations of 810 may be performed by a quarantine identifier 530 as described with reference to FIG. 5.

At 815, the method may include executing, by the backup system after determining that the snapshot is not prohibited from restoration, a quarantine enforcement procedure in association with recovering the snapshot. The operations of 815 may be performed in accordance with examples as disclosed herein. In some examples, aspects of the operations of 815 may be performed by a quarantine enforcement component 535 as described with reference to FIG. 5.

To execute the quarantine enforcement procedure, the method may include validating a first file path associated with the target computing object, where the one or more performance metrics are based on whether the first file path is validated. For example, to validate the first file path, at 820, the method may include converting, based on the quarantine enforcement procedure, a second file path associated with the target computing object to the first file path, where the second file path is of a second type, and where the first file path is of a first type that is compatible with the backup system. The operations of 820 may be performed in accordance with examples as disclosed herein. In some examples, aspects of the operations of 820 may be performed by a path conversion component 555 as described with reference to FIG. 5.

Further to validate the first file path, at 825, the method may include validating that conversion of the second file path to the first file path is successful. The operations of 825 may be performed in accordance with examples as disclosed herein. In some examples, aspects of the operations of 825 may be performed by a path validation component 545 as described with reference to FIG. 5.

At 830, the method may include determining at least one first performance metric of the one or more performance metrics based on a quantity of errors identified in association with converting the second file path to the first file path. The operations of 830 may be performed in accordance with examples as disclosed herein. In some examples, aspects of the operations of 830 may be performed by a performance metric component 540 as described with reference to FIG. 5.

At 835, the method may include monitoring, by the backup system, one or more performance metrics associated with execution of the quarantine enforcement procedure. The operations of 835 may be performed in accordance with examples as disclosed herein. In some examples, aspects of the operations of 835 may be performed by a performance metric component 540 as described with reference to FIG. 5.

Figure 9:
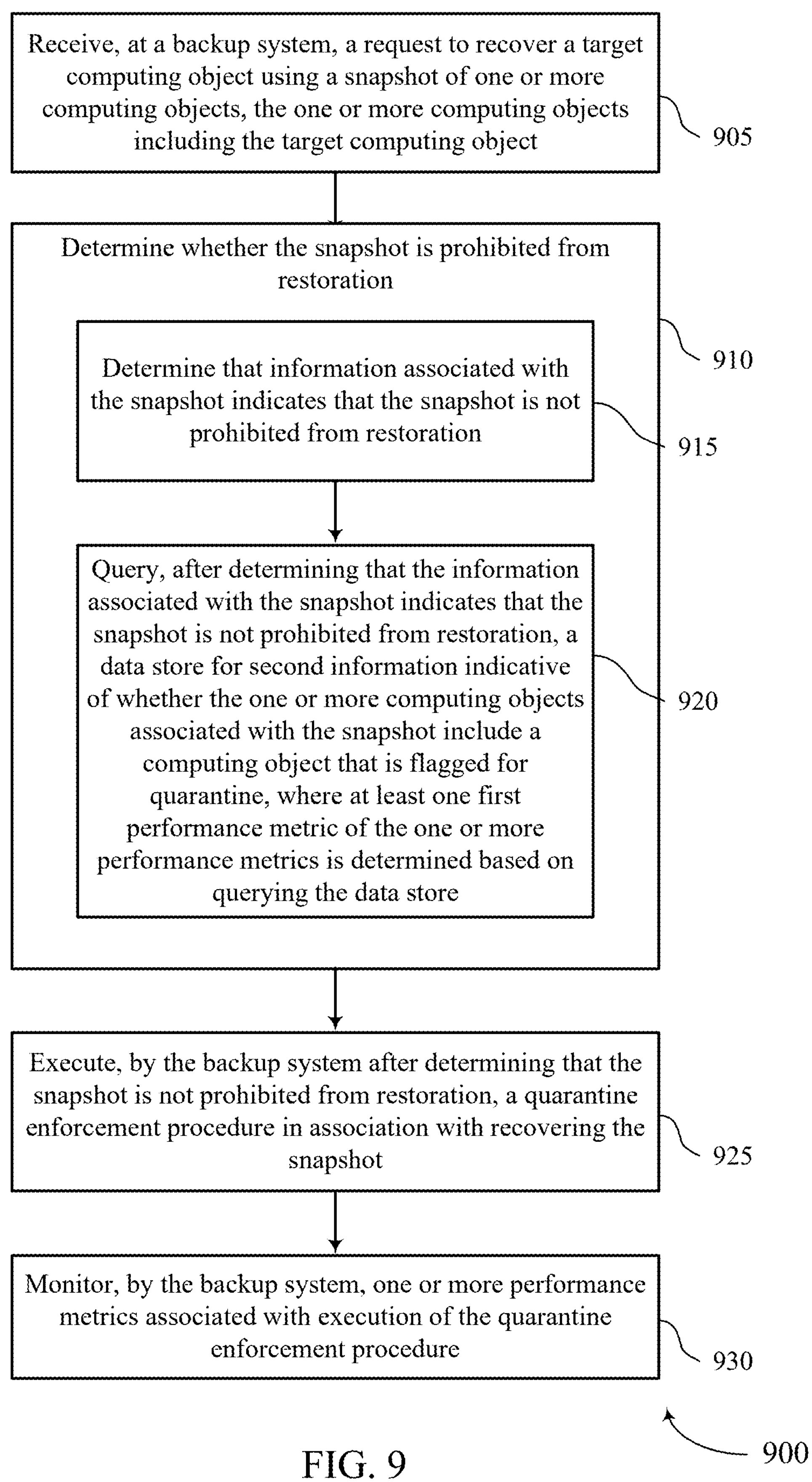

FIG. 9 shows a flowchart illustrating a method 900 that supports enforcement of quarantine middleware execution for performance metrics in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include receiving, at a backup system, a request to recover a target computing object using a snapshot of one or more computing objects, the one or more computing objects including the target computing object. The operations of 905 may be performed in accordance with examples as disclosed herein. In some examples, aspects of the operations of 905 may be performed by a recovery request interface 525 as described with reference to FIG. 5.

At 910, the method may include determining, by the backup system in response to the request, whether the snapshot is prohibited from restoration based on whether information associated with the snapshot is flagged for quarantine. The operations of 910 may be performed in accordance with examples as disclosed herein. In some examples, aspects of the operations of 910 may be performed by a quarantine identifier 530 as described with reference to FIG. 5.

To determine whether the snapshot is prohibited from restoration, at 915, the method may include determining that the information associated with the snapshot indicates that the snapshot is not prohibited from restoration. The operations of 915 may be performed in accordance with examples as disclosed herein. In some examples, aspects of the operations of 915 may be performed by a quarantine identifier 530 as described with reference to FIG. 5.

Further to determine whether the snapshot is prohibited from restoration, at 920, the method may include querying, after determining that the information associated with the snapshot indicates that the snapshot is not prohibited from restoration, a data store for second information indicative of whether the one or more computing objects associated with the snapshot include a computing object that is flagged for quarantine, where at least one first performance metric of the one or more performance metrics is determined based on querying the data store. The operations of 920 may be performed in accordance with examples as disclosed herein. In some examples, aspects of the operations of 920 may be performed by a quarantine identifier 530 as described with reference to FIG. 5.

At 925, the method may include executing, by the backup system after determining that the snapshot is not prohibited from restoration, a quarantine enforcement procedure in association with recovering the snapshot. The operations of 925 may be performed in accordance with examples as disclosed herein. In some examples, aspects of the operations of 925 may be performed by a quarantine enforcement component 535 as described with reference to FIG. 5.

At 930, the method may include monitoring, by the backup system, one or more performance metrics associated with execution of the quarantine enforcement procedure. The operations of 930 may be performed in accordance with examples as disclosed herein. In some examples, aspects of the operations of 930 may be performed by a performance metric component 540 as described with reference to FIG. 5.

Figure 10:
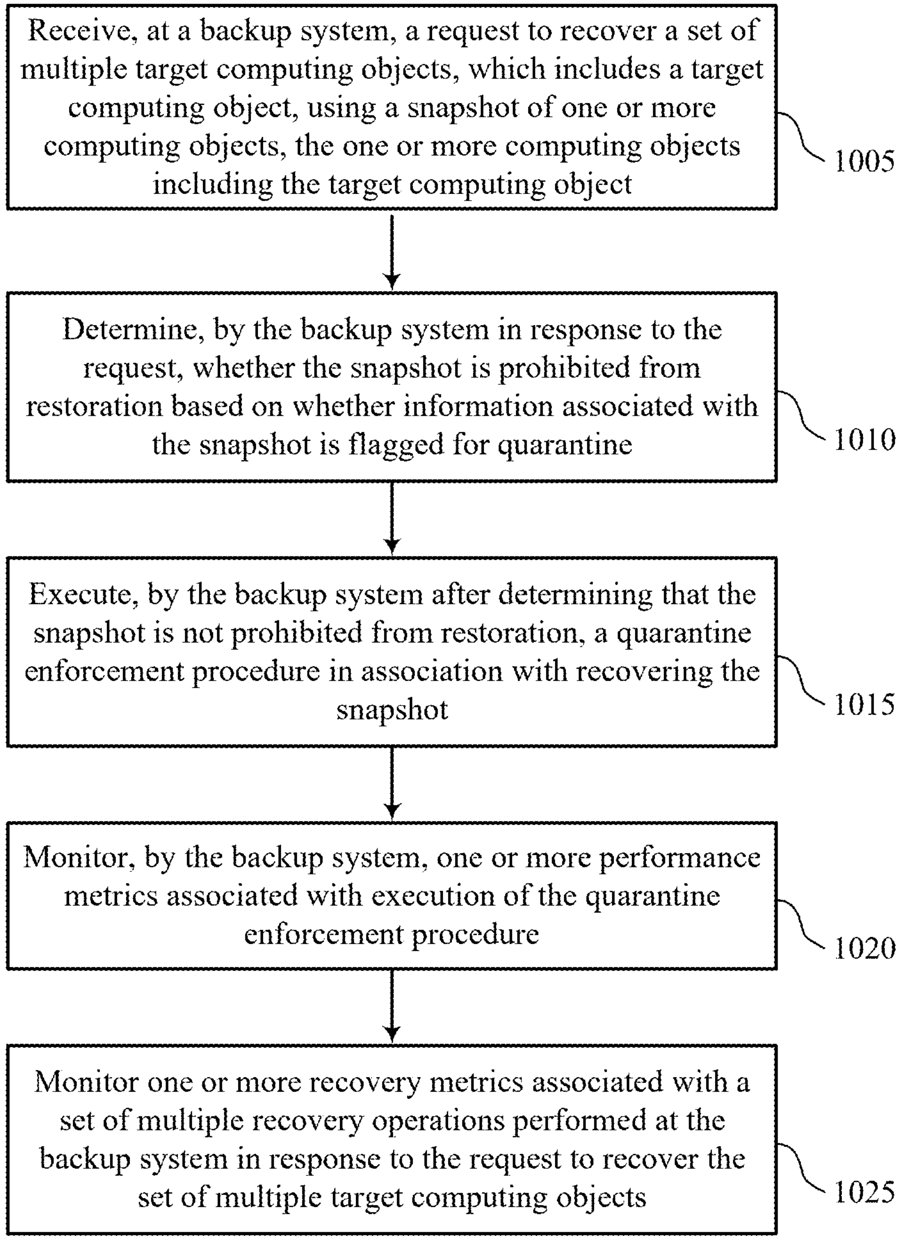

FIG. 10 shows a flowchart illustrating a method 1000 that supports enforcement of quarantine middleware execution for performance metrics in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include receiving, at a backup system, a request to recover a set of multiple target computing objects, which includes a target computing object, using a snapshot of one or more computing objects, the one or more computing objects including the target computing object. The operations of 1005 may be performed in accordance with examples as disclosed herein. In some examples, aspects of the operations of 1005 may be performed by a recovery request interface 525 as described with reference to FIG. 5.

At 1010, the method may include determining, by the backup system in response to the request, whether the snapshot is prohibited from restoration based on whether information associated with the snapshot is flagged for quarantine. The operations of 1010 may be performed in accordance with examples as disclosed herein. In some examples, aspects of the operations of 1010 may be performed by a quarantine identifier 530 as described with reference to FIG. 5.

At 1015, the method may include executing, by the backup system after determining that the snapshot is not prohibited from restoration, a quarantine enforcement procedure in association with recovering the snapshot. The operations of 1015 may be performed in accordance with examples as disclosed herein. In some examples, aspects of the operations of 1015 may be performed by a quarantine enforcement component 535 as described with reference to FIG. 5.

At 1020, the method may include monitoring, by the backup system, one or more performance metrics associated with execution of the quarantine enforcement procedure. The operations of 1020 may be performed in accordance with examples as disclosed herein. In some examples, aspects of the operations of 1020 may be performed by a performance metric component 540 as described with reference to FIG. 5.

At 1025, the method may include monitoring one or more recovery metrics associated with a set of multiple recovery operations performed at the backup system in response to the request to recover the set of multiple target computing objects. The operations of 1025 may be performed in accordance with examples as disclosed herein. In some examples, aspects of the operations of 1025 may be performed by a recovery metric component 550 as described with reference to FIG. 5.

A method by an apparatus is described. The method may include receiving, at a backup system, a request to recover a target computing object using a snapshot of one or more computing objects, the one or more computing objects including the target computing object, determining, by the backup system in response to the request, whether the snapshot is prohibited from restoration based on whether information associated with the snapshot is flagged for quarantine, executing, by the backup system after determining that the snapshot is not prohibited from restoration, a quarantine enforcement procedure in association with recovering the snapshot, and monitoring, by the backup system, one or more performance metrics associated with execution of the quarantine enforcement procedure.

An apparatus is described. The apparatus may include one or more memories storing processor executable code, and one or more processors coupled with the one or more memories. The one or more processors may individually or collectively be operable to execute the code to cause the apparatus to receive, at a backup system, a request to recover a target computing object using a snapshot of one or more computing objects, the one or more computing objects including the target computing object, determine, by the backup system in response to the request, whether the snapshot is prohibited from restoration based on whether information associated with the snapshot is flagged for quarantine, execute, by the backup system after determining that the snapshot is not prohibited from restoration, a quarantine enforcement procedure in association with recovering the snapshot, and monitor, by the backup system, one or more performance metrics associated with execution of the quarantine enforcement procedure.

Another apparatus is described. The apparatus may include means for receiving, at a backup system, a request to recover a target computing object using a snapshot of one or more computing objects, the one or more computing objects including the target computing object, means for determining, by the backup system in response to the request, whether the snapshot is prohibited from restoration based on whether information associated with the snapshot is flagged for quarantine, means for executing, by the backup system after determining that the snapshot is not prohibited from restoration, a quarantine enforcement procedure in association with recovering the snapshot, and means for monitoring, by the backup system, one or more performance metrics associated with execution of the quarantine enforcement procedure.

A non-transitory computer-readable medium storing code is described. The code may include instructions executable by one or more processors to receive, at a backup system, a request to recover a target computing object using a snapshot of one or more computing objects, the one or more computing objects including the target computing object, determine, by the backup system in response to the request, whether the snapshot is prohibited from restoration based on whether information associated with the snapshot is flagged for quarantine, execute, by the backup system after determining that the snapshot is not prohibited from restoration, a quarantine enforcement procedure in association with recovering the snapshot, and monitor, by the backup system, one or more performance metrics associated with execution of the quarantine enforcement procedure.

In some examples of the method, apparatus, and non-transitory computer-readable medium described herein, operations, features, means, or instructions for executing the quarantine enforcement procedure may include operations, features, means, or instructions for validating a first file path associated with the target computing object, where the one or more performance metrics may be based on whether the first file path may be validated.

In some examples of the method, apparatus, and non-transitory computer-readable medium described herein, operations, features, means, or instructions for validating the first file path may include operations, features, means, or instructions for converting, based on the quarantine enforcement procedure, a second file path associated with the target computing object to the first file path, where the second file path may be of a second type, and where the first file path may be of a first type that may be compatible with the backup system and validating that conversion of the second file path to the first file path may be successful.

Some examples of the method, apparatus, and non-transitory computer-readable medium described herein may further include operations, features, means, or instructions for determining at least one first performance metric of the one or more performance metrics based on a quantity of errors identified in association with converting the second file path to the first file path.

Some examples of the method, apparatus, and non-transitory computer-readable medium described herein may further include operations, features, means, or instructions for determining at least one first performance metric of the one or more performance metrics based on a conversion time associated with conversion of the second file path to the first file path.

In some examples of the method, apparatus, and non-transitory computer-readable medium described herein, operations, features, means, or instructions for determining whether the snapshot may be prohibited from restoration may include operations, features, means, or instructions for determining that the information associated with the snapshot indicates that the snapshot is not prohibited from restoration and querying, after determining that the information associated with the snapshot indicates that the snapshot is not prohibited from restoration, a data store for second information indicative of whether the one or more computing objects associated with the snapshot include a computing object that may be flagged for quarantine, where at least one first performance metric of the one or more performance metrics may be determined based on querying the data store.

Some examples of the method, apparatus, and non-transitory computer-readable medium described herein may further include operations, features, means, or instructions for determining the at least one first performance metric based on a query response time associated with querying the data store for the second information.

Some examples of the method, apparatus, and non-transitory computer-readable medium described herein may further include operations, features, means, or instructions for determining the at least one first performance metric based on a quantity of errors identified in response to querying the data store for the second information.

In some examples of the method, apparatus, and non-transitory computer-readable medium described herein, the request to recover the target computing object includes a request to recover a set of multiple target computing objects that includes the target computing object and the method, apparatuses, and non-transitory computer-readable medium may include further operations, features, means, or instructions for monitoring one or more recovery metrics associated with a set of multiple recovery operations performed at the backup system in response to the request to recover the set of multiple target computing objects.

Some examples of the method, apparatus, and non-transitory computer-readable medium described herein may further include operations, features, means, or instructions for determining, as a recovery metric of the one or more recovery metrics, a quantity of recovery operations included in the set of multiple recovery operations.

Some examples of the method, apparatus, and non-transitory computer-readable medium described herein may further include operations, features, means, or instructions for determining, as a recovery metric of the one or more recovery metrics, types of computing objects being recovered for the set of multiple recovery operations, a quantity of snapshots or files recovered per recovery operation of the set of multiple recovery operations, a set of file types or parent folders per recovery operation of the set of multiple recovery operations, user details associated with initiating each recovery operation of the set of multiple recovery operations, or any combination thereof.

In some examples of the method, apparatus, and non-transitory computer-readable medium described herein, operations, features, means, or instructions for executing the quarantine enforcement procedure may include operations, features, means, or instructions for executing the quarantine enforcement procedure despite determining that the snapshot is not prohibited from restoration in accordance with a configuration at the backup system, where the configuration specifies that a quarantine enforcement metric monitoring mode may be active, that the quarantine enforcement procedure may be executed for at least a threshold portion of recovery operations, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, at a backup system, a request to recover a target computing object using a snapshot of one or more computing objects, the one or more computing objects comprising the target computing object;

determining, by the backup system in response to the request, whether the snapshot is prohibited from restoration based at least in part on whether information associated with the snapshot is flagged for quarantine;

executing, by the backup system after determining that the snapshot is not prohibited from restoration, a quarantine enforcement procedure in association with recovering the snapshot; and monitoring, by the backup system, one or more performance metrics associated with execution of the quarantine enforcement procedure.

2. The method of claim 1, wherein executing the quarantine enforcement procedure comprises:

validating a first file path associated with the target computing object, wherein the one or more performance metrics are based at least in part on whether the first file path is validated.

3. The method of claim 2, wherein validating the first file path comprises:

converting, based at least in part on the quarantine enforcement procedure, a second file path associated with the target computing object to the first file path, wherein the second file path is of a second type, and wherein the first file path is of a first type that is compatible with the backup system; and validating that conversion of the second file path to the first file path is successful.

4. The method of claim 3, further comprising:

determining at least one first performance metric of the one or more performance metrics based at least in part on a quantity of errors identified in association with converting the second file path to the first file path.

5. The method of claim 3, further comprising:

determining at least one first performance metric of the one or more performance metrics based at least in part on a conversion time associated with conversion of the second file path to the first file path.

6. The method of claim 1, wherein determining whether the snapshot is prohibited from restoration comprises:

determining that the information associated with the snapshot indicates that the snapshot is not prohibited from restoration; and querying, after determining that the information associated with the snapshot indicates that the snapshot is not prohibited from restoration, a data store for second information indicative of whether the one or more computing objects associated with the snapshot comprise a computing object that is flagged for quarantine, wherein at least one first performance metric of the one or more performance metrics is determined based at least in part on querying the data store.

7. The method of claim 6, further comprising:

determining the at least one first performance metric based at least in part on a query response time associated with querying the data store for the second information.

8. The method of claim 6, further comprising:

determining the at least one first performance metric based at least in part on a quantity of errors identified in response to querying the data store for the second information.

9. The method of claim 1, wherein the request to recover the target computing object comprises a request to recover a plurality of target computing objects that includes the target computing object, the method further comprising:

monitoring one or more recovery metrics associated with a plurality of recovery operations performed at the backup system in response to the request to recover the plurality of target computing objects.

10. The method of claim 9, further comprising:

determining, as a recovery metric of the one or more recovery metrics, a quantity of recovery operations included in the plurality of recovery operations.

11. The method of claim 9, further comprising:

determining, as a recovery metric of the one or more recovery metrics, types of computing objects that are recovered for the plurality of recovery operations, a quantity of snapshots or files recovered per recovery operation of the plurality of recovery operations, a set of file types or parent folders per recovery operation of the plurality of recovery operations, user details associated with initiating each recovery operation of the plurality of recovery operations, or any combination thereof.

12. The method of claim 1, wherein executing the quarantine enforcement procedure comprises:

executing the quarantine enforcement procedure despite determining that the snapshot is not prohibited from restoration in accordance with a configuration at the backup system, wherein the configuration specifies that a quarantine enforcement metric monitoring mode is active, that the quarantine enforcement procedure is to be executed for at least a threshold portion of recovery operations, or any combination thereof.

13. An apparatus, comprising:

one or more memories storing processor-executable code; and one or more processors coupled with the one or more memories and individually or collectively operable to execute the code to cause the apparatus to:

receive, at a backup system, a request to recover a target computing object using a snapshot of one or more computing objects, the one or more computing objects comprising the target computing object;

determine, by the backup system in response to the request, whether the snapshot is prohibited from restoration based at least in part on whether information associated with the snapshot is flagged for quarantine;

execute, by the backup system after determining that the snapshot is not prohibited from restoration, a quarantine enforcement procedure in association with recovering the snapshot; and monitor, by the backup system, one or more performance metrics associated with execution of the quarantine enforcement procedure.

14. The apparatus of claim 13, wherein, to execute the quarantine enforcement procedure, the one or more processors are individually or collectively operable to execute the code to cause the apparatus to:

validate a first file path associated with the target computing object, wherein the one or more performance metrics are based at least in part on whether the first file path is validated.

15. The apparatus of claim 14, wherein, to validate the first file path, the one or more processors are individually or collectively operable to execute the code to cause the apparatus to:

convert, based at least in part on the quarantine enforcement procedure, a second file path associated with the target computing object to the first file path, wherein the second file path is of a second type, and wherein the first file path is of a first type that is compatible with the backup system; and validate that conversion of the second file path to the first file path is successful.

16. The apparatus of claim 15, wherein the one or more processors are individually or collectively further operable to execute the code to cause the apparatus to:

determine at least one first performance metric of the one or more performance metrics based at least in part on a quantity of errors identified in association with converting the second file path to the first file path.

17. A non-transitory computer-readable medium storing code, the code comprising instructions executable by one or more processors to:

receive, at a backup system, a request to recover a target computing object using a snapshot of one or more computing objects, the one or more computing objects comprising the target computing object;

determine, by the backup system in response to the request, whether the snapshot is prohibited from restoration based at least in part on whether information associated with the snapshot is flagged for quarantine;

execute, by the backup system after determining that the snapshot is not prohibited from restoration, a quarantine enforcement procedure in association with recovering the snapshot; and monitor, by the backup system, one or more performance metrics associated with execution of the quarantine enforcement procedure.

18. The non-transitory computer-readable medium of claim 17, wherein, to execute the quarantine enforcement procedure, the instructions are executable by the one or more processors to:

validate a first file path associated with the target computing object, wherein the one or more performance metrics are based at least in part on whether the first file path is validated.

19. The non-transitory computer-readable medium of claim 18, wherein, to validate the first file path, the instructions are executable by the one or more processors to:

convert, based at least in part on the quarantine enforcement procedure, a second file path associated with the target computing object to the first file path, wherein the second file path is of a second type, and wherein the first file path is of a first type that is compatible with the backup system; and validate that conversion of the second file path to the first file path is successful.

20. The non-transitory computer-readable medium of claim 19, wherein the instructions are further executable by the one or more processors to:

determine at least one first performance metric of the one or more performance metrics based at least in part on a quantity of errors identified in association with converting the second file path to the first file path.

* * * * *